July 24, 1962 R. CASTRO ETAL 3,045,483
AIRCRAFT INSTRUMENTATION
Filed March 15, 1957 3 Sheets-Sheet 2
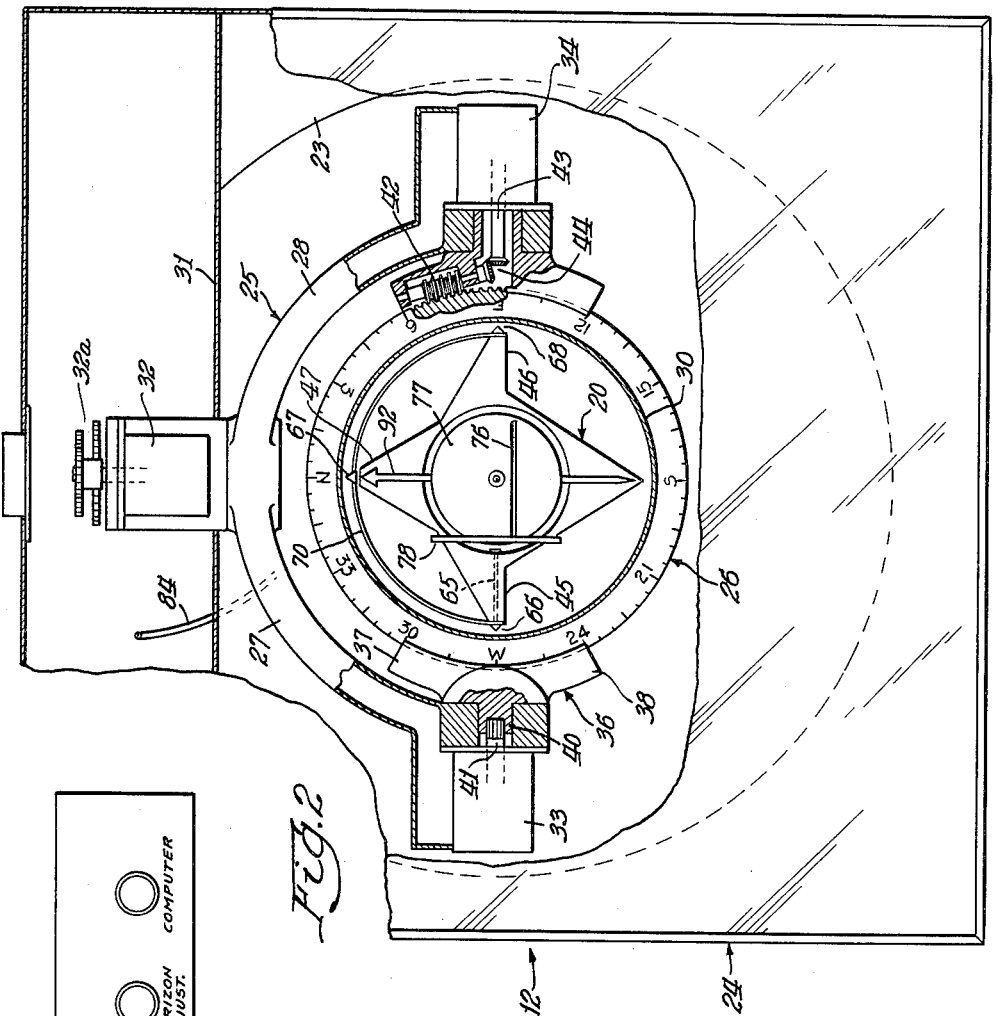
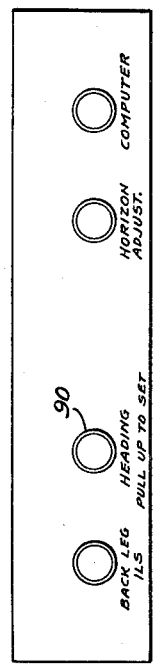
Inventors:
Raoul Castro and
Alexander M. Hasse
By: Joseph R. Dwyer Atty.

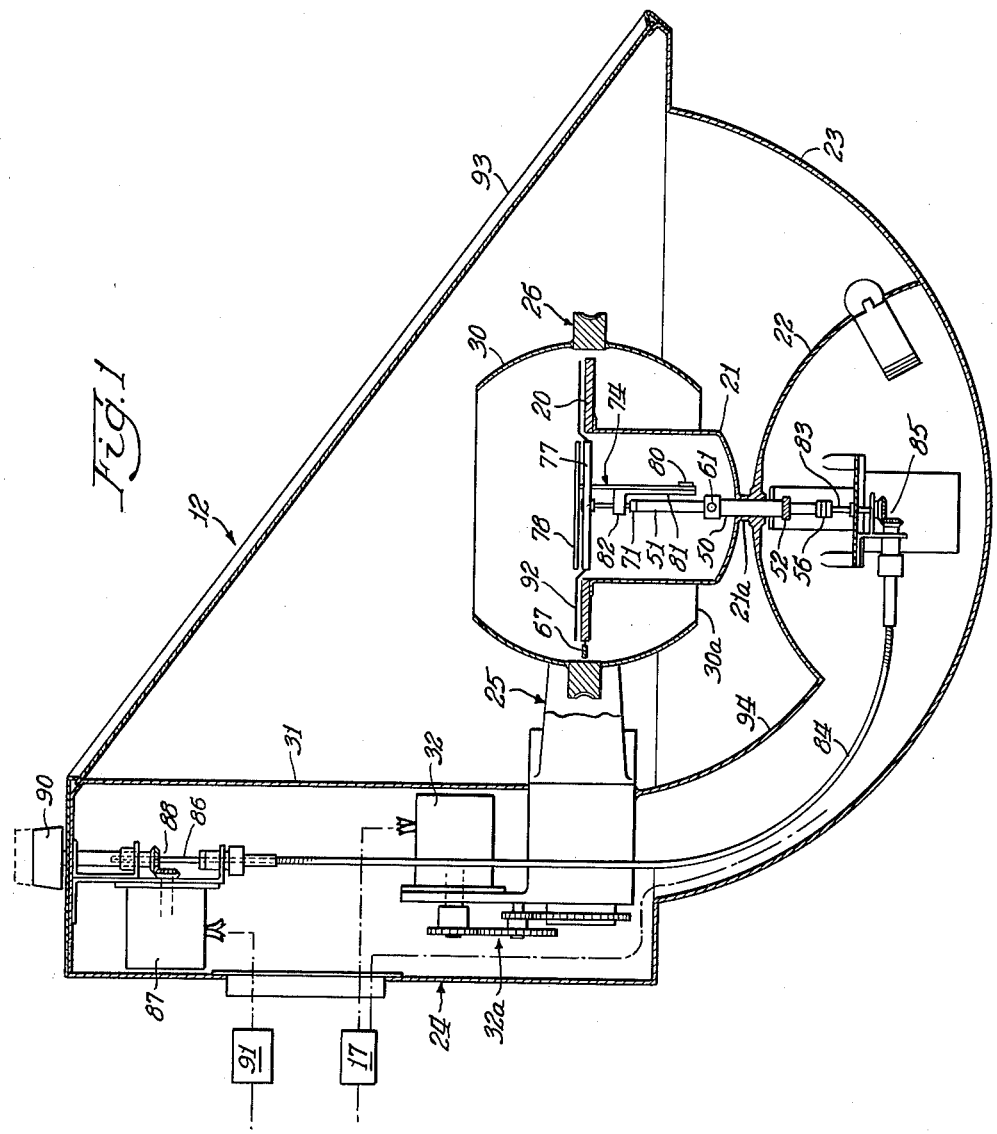

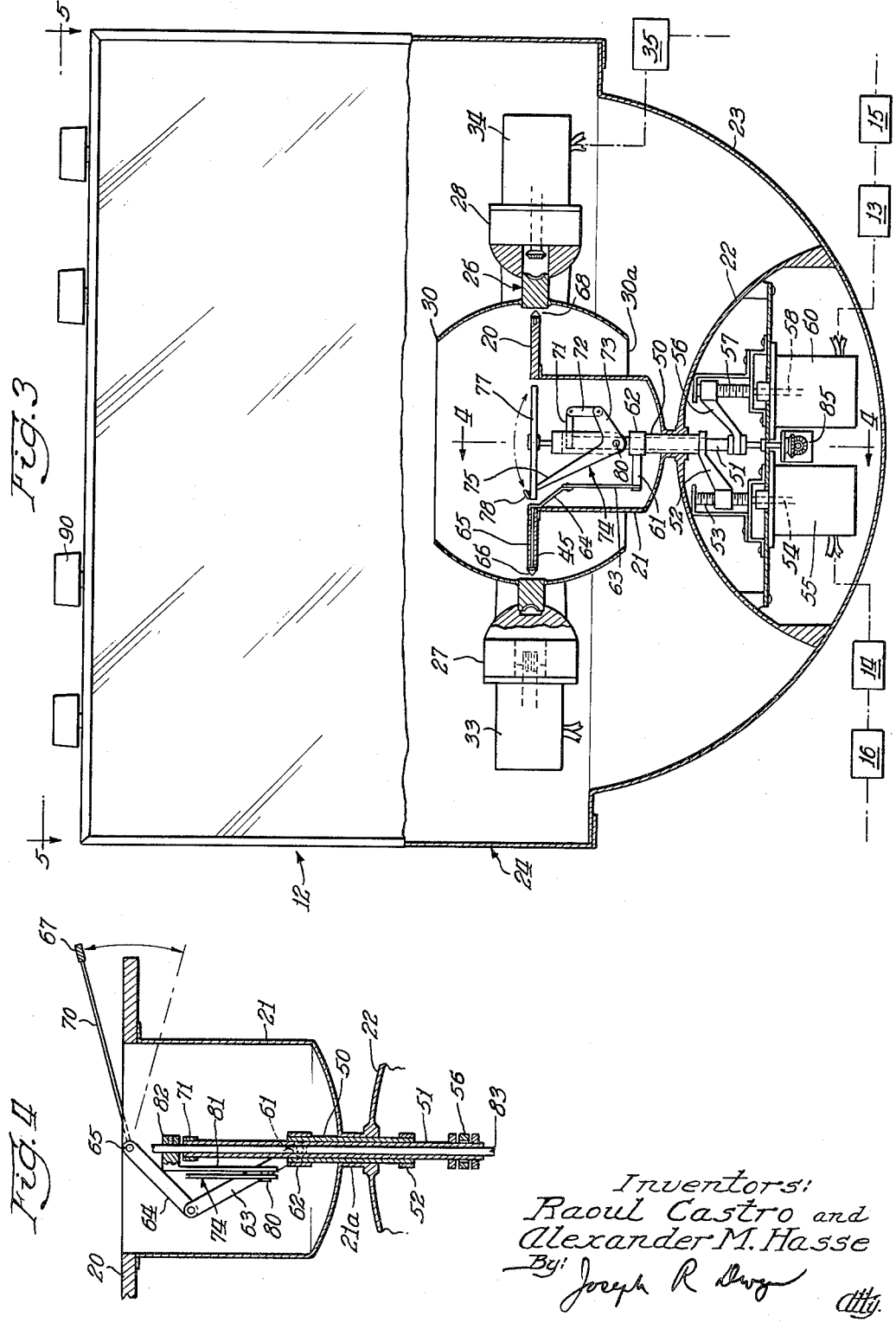

United States Patent Office 3,045,483
Patented July 24, 1962

3,045,483
AIRCRAFT INSTRUMENTATION
Raoul Castro, Box 56, Brookfield, Ill., and Alexander M. Hasse, Fort Worth, Tex.; said Hasse assignor to said Castro
Filed Mar. 15, 1957, Ser. No. 646,380
18 Claims. (Cl. 73—178)

This invention relates in general to aircraft instrumentation and relates in particular to a new and improved aircraft instrumentation especially suitable for "blind" flying conditions.

In the field of aircraft instrumentation, one of the major problems of instrument flying with conventional instruments is the interpretation required by the pilot from the information presented to him. A pilot flying under visual flight conditions is accustomed to interpreting the attitude of the aircraft by judging of the position of the wings, for example, with respect to the horizon—a three dimensional orientation. On the other hand, when instrument flying is required, the pilot must re-evaluate and interpret the attitude of the aircraft according to information presented to him on the conventional vertically disposed instruments on a panel—a two dimensional presentation. The pilot's ability, therefore, to fly the same aircraft with visual reference to the ground as compared to flying when the ground is obscured, is largely dependent on the information presented to him and his interpretation thereof. Obviously, when a pilot is accustomed to a three dimensional orientation of the plane with respect to the ground (which, by the way, is also the condition under which he learned to fly), orientation of the plane by the two dimensional information presented to him on the conventional instruments requires interpretation time. This time lag between the actual events as they are happening with respect to the plane and as finally interpreted (even if correctly interpreted) may be dangerous under certain circumstances.

If, therefore, the pilot can be presented with information more closely resembling actual events, or otherwise stated, more closely relating to what the pilot is accustomed to preceiving under visual flight conditions, the time lag and any errors due to misinterpretation will be reduced. The accomplishment of this end or object represents the primary purpose of our invention.

Another and important feature of this invention is the adaptation thereof into presently used navigational systems or flight director systems for indicating or conveying flight information for enroute navigation and precise instrument approaches.

We propose to accomplish the primary object and feature of our invention by providing a miniature replica of the aircraft fixedly mounted on the aircraft itself (or on some part thereof) so as to move about the three principal axes of movement with the aircraft itself. This replica is also disposed for free universal movement with respect to and within a gyroscopically fixed means representing the horizon and means by which the heading of the aircraft is represented. It is important to note that with this miniature replica directly connected to the aircraft itself, any pitch, roll, yaw or change of heading, of the aircraft will be immediately reflected in the position of the replica with respect to the horizon indicating means and the heading indicating means and since both these means encompass or surround the replica, a true three dimensional presentation is accomplished as will be more clearly understood hereinafter. To especially adapt our invention for flying presently used navigational systems, we have provided a means of conveying in flight information for enroute navigation and precise instrument landing approaches by incorporating a course indicator, commonly called a course bar, indicating the desired course and displacement therefrom and a glide path indicator, both of which are responsive to signals received from some preselected radio guiding means or course finders which transmit signals from a transmitter and are received by the receiver in the aircraft in a well-known manner so that the navigational path, that is, either or both the course path and glide path selected by the pilot for travel of the aircraft, and its displacement therefrom, are indicated. In this manner there is accomplished three dimensional presentation of the events relating to the aircraft in the exact manner in which the pilot is accustomed to perceiving them.

It is important to note in connection with our instrument that we have accomplished all of this in one compact instrument and other navigational aids presently in use may be incorporated in our invention. This accomplishment in part is due to a new and improved means of moving the various elements that make up our instrument to present the desired information to the pilot. Incidentally, other navigational aids may be incorporated in our invention and it will be apparent to those skilled in instrument flying that we are able to eliminate many instruments necessitated by the practice of having vertically disposed instruments on a panel.

Accordingly, it is still another goal of our invention to provide a new and improved aircraft instrumentation which closely simulates visual flying conditions reducing the time required to respond to the information presented and incorporated enroute and landing flight information, all in one compact device.

These and other objects of our invention will become apparent from the following description when taken in connection with the accompanying drawings in which:

FIGURE 1 is a side view, partially in section, showing to advantage the aircraft instrument constructed in accordance with the teachings of our invention as arranged for mounting on the aircraft instrument panel;

FIGURE 2 is a plan view partially in section showing to advantage the miniature replica of the aircraft as disposed for universal movement with respect to the means representing the horizon and the compass, all constructed in accordance with the teachings of our invention;

FIGURE 3 is an elevational view partially in section showing to advantage the course indicator and glide path indicator mechanism of our invention;

FIGURE 4 is an enlarged view of the glide path indicating mechanism taken along line 4—4 of FIGURE 3; and FIGURE 5 is a view of the instrument panel taken along line 5—5 of FIGURE 3.

Referring now to the drawings where like reference characters designate like parts throughout the several views, there is shown particularly in FIGURE 1, our aircraft instrument indicated in its entirety as 12, suitably connected to a pair of servo motors or like devices 13 and 14 each of which is respectively coupled to a localizer receiver or like device and a glide path receiver or like device indicated in their entirety as 15 and 16, respectively. Servo motor or like device 13 and servo motor or like device 14, being coupled for purposes of illustration to the receivers 15 and 16, cause operation of a pair of synchronously coupled servo motors or like devices in the instrument 12 as will be explained in detail hereinafter.

A pitch and bank unit 17 containing a conventional electrically driven gyroscope having a vertical spin axis is connected to a pair of servo motors or like devices within the instrument 12, as will be explained in detail hereinafter, for the pitch and roll axis of the aircraft itself. Unit 17 will supply an electrical signal in accordance with the relative attitude between the aircraft itself and the horizontal position to which it is directed in both the pitch and roll axis is a well-known manner.

Referring now to FIGURES 2 and 3 where there is shown the preferred form of an aircraft instrument constructed in accordance with our invention, the instrument 12 comprises a horizontally disposed miniature aircraft replica 20 fixedly attached on a vertical hollow upwardly opening cup-like cylindrical member 21. Hollow member 21 is suitably affixed by means of an integral hollow tubular portion 21a to a hollow semi-spherical downwardly opening base 22 and extends therethrough. Base 22 is in turn attached by any suitable means to a hollow upwardly opening semi-spherical base cover 23 and which forms part of the enclosure, indicated in its entirety as 24 (FIGURE 1) for the instrument, the details of which will be explained more in detail.

Replica 20 being fixedly mounted to base 22 and base cover 23, in the embodiment shown, is fixedly attached to move with the aircraft through the attachment of the enclosure 24 to the aircraft itself thus forming an integral part of the aircraft. Replica 20, being disposed on top of the cup-like member 21, is so constructed and arranged as to be on the same horizontal plane with a U-shaped gimbal 25 and a horizontally mounted ring-shaped compass ring 26; the latter being of smaller outer diameter than the inner edges of, and disposed within, arms 27 and 28 of the gimbal 25. Attached to the radially inward edge of the compass ring 26 and partially surrounding the replica 20, is a hollow spherical enclosure means 30 which moves with the compass ring; said enclosure means 30 being open at the bottom as at 30a to movably cooperate with cup-like member 21 as will be apparent hereinafter. Gimbal 25 is connected to the instrument housing 31, which forms part of the enclosure 24, either directly through a servo motor or the like device 32 or through a gearing system 32a as shown whereby the servo motor causes a raising or lowering of arms 27 and 28 with respect to the replica 20. Actually under flight conditions, it is the gimbal 25 that remains horizontal to represent the earth's horizon to which the roll of the aircraft and replica 20 will be referenced. The operation of the servo motor 32 to cause the gimbal to remain horizontal when the aircraft is banking or rolling is in response to the signal received in the servo motor 32 from the pitch and roll unit 17 to which it is connected.

The outer extremities of the arms 27 and 28 of the gimbal have a pair of servo motors or like devices 33 and 34 which are conveniently located with respect to the housing so that they may move upwardly or downwardly, respectively, with the movement of the arms of the gimbal in response to any roll of the aircraft and are so constructed and arranged as to be operable in any position of the arms. Servo motor 33 being connected to the pitch and bank unit 17 causes the forward portion (as viewed in the drawings) of the compass ring 26 and hemispherical means to move upwardly or downwardly (and the backward portion thereof to move correspondingly upwardly or downwardly) to indicate the pitch of the aircraft. Actually, it is the compass and hemispherical means which remains horizontal, with the replica (by reason of its departure from horizon—as indicated with reference to the compass ring and hemisphere) indicating the pitch of the aircraft. Servo motor 34 being suitably connected to an output servo motor or like device of a gyroscopic compass, indicated in its entirety as 35, causes movement of the compass ring 26 according to the heading of the aircraft in a well-known manner.

In more particularity, an attaching means 36, having a pair of outwardly extending arms 37 and 38 of the same arcuate dimension as the periphery of the compass ring 26 and further having an oppositely radially outwardly extending cylindrical arm 40 for receiving shaft 41 of the servo motor, connects the compass ring 26 to the servo motor 33 to cause rotation of the compass ring about a tilt axis normal to the rotation axis of the gimbal in response to a signal received from pitch and bank unit 17. The compass ring is also provided with peripheral gear teeth which intermesh with a worm gear 42 which in turn is connected to shaft 43 of the servo motor 34 through intermeshing gears 44 whereby rotation of the shaft 43 in response to a signal received from the gyroscopic compass 35 causes the compass ring 26 to rotate horizontally about its axis relative to the craft so as to maintain its orientation in azimuth. Thus, it can be seen that the wing tips 45 and 46 of the replica 20 being fixedly mounted to the aircraft itself form instrument pointers which indicate to the pilot any roll or bank of the aircraft by the relationship between the compass ring 26 and the wing tips. In addition, any pitch of the aircraft will be discernible by the relationship of the nose and the compass ring. Thus, as can be seen, the three dimensional visual relationship between the replica and the compass duplicates precisely the activity of the aircraft with respect to the earth and for that reason instrument flying by our invention is greatly improved.

Turning now to FIGURES 3 and 5, it can be seen that a pair of hollow coaxial rods 50 and 51 extending at their upper end into cup-like member 21 are slidably disposed in the hollow tubular portion 21a of the cup-like member 21 and project beyond the lower end of the tubular portion 21a and are connected to servo motors or like devices. Rod 50 is fixedly attached at its lower end to one end of an arm 52. The other end of arm 52 is threadably connected to a rotatable screw 53. Screw 53, being fixedly connected to rotatable shaft 54 of servo motor 55 causes the arm 52 to move upwardly or downwardly dependent upon the direction of rotation of shaft 54. Movement upwardly or downwardly of the arm 52 causes a corresponding movement upwardly or downwardly of the rod 50. In a similar manner, rod 51 (in this embodiment slidably disposed within the rod 50) is connected at its lower end to one end of an arm 56. The opposite end of arm 56 is threadably connected to a rotatable screw 57 which in turn is fixedly connected to shaft 58 of servo motor 60. Rotation of the shaft 58 causes movement upwardly or downwardly of the arm 56 and concurrent movement upward or downward of the rod 51 in a manner similar to that described in connection with rod 50.

The upper end of rod 50 is provided with a horizontally extending arm 61 fixedly attached at one end to a collar 62 which in turn is fixedly attached to the rod 50. The other end of arm 61 is pivotally connected to an upwardly extending arm 63 (more clearly shown in FIGURE 4). The other end of arm 63 is pivotally connected at its other end to an upwardly extending arm 64 to form a linkage between the arm 61 and a horizontally extending rod 65 mounted at the top edge or rim of the cup-like member 21. Rod 65 is fixedly attached to the arm 64 so that the linkage means, upon operative upward and downward movement of arm 61, rotates the rod 65 about its longitudinal axis. The end of the rod 65 opposite to the arm 64 extends radially outwardly beyond the tip 45 of the miniature replica 20, in which the rod is pivotally received, and has attached thereto a tip-like pointer member 66 which rotates with the rod 65.

Pointer member 66 is connected to pointer members 67 and 68 (FIGURE 2) by means of curved rod or wire 70. Pointer members 66, 67 and 68 are so spaced about the periphery of the miniature replica 20 so as to coincide with, and form part of, the pointers 45, 46 and 47, above described, formed by the replica itself. It is to be noted that pointer member 68 is pivotally connected to the replica, and in this manner rotational movement of the arm 65 and pointer 66 will cause rotational movement of the pointer 68 and an upward or downward movement of the pointer 67 with respect to the nose 47 of the replica as shown in FIGURE 4. From the above description it can be seen that upward or downward movement of the rod 50 by operation of the servo motor 55 will cause an upward or downward movement of the pointer member 67 (glide path indicator) by operation of the linkage above described.

Similarly, the upper end of rod 51 is fixedly connected to one end of a horizontally extending arm 71 for movement therewith. The other end of rod 71 is pivotally connected to one end of a downwardly extending arm 72 which in turn is pivotally connected at its other end to one end of an arm 73 forming an integral part of an L-shaped element 74. The other arm 75 of the L-shaped link element 74 extends upwardly and through a slot 76 formed in a relatively flat circular plate 77 located in the plane of the replica 20. Plate 77, being of lesser diameter than the corresponding inner diameter of the hole formed in the replica 20, is free to rotate about its vertical axis with respect to the replica 20 and the arm 75 has a course bar 78 attached at an angle thereto and parallel with the plane of the replica 20 and the plate 77 for reasons hereinafter to be described. The lower end of arm 74 which also forms the other extremity of arm 73 is connected, as at 80, for pivotal movement, to a downwardly extending arm 81 integrally formed on collar 82. This collar 82 is in turn fixedly attached to a vertically extending rotatable rod 83 of diameter less than the inner diameter of hollow rods 50 and 51 and rotatably received therein so as to be free to rotate the L-shaped member 74 and the circular plate 77 for a purpose hereinafter described.

From the above description it can be seen that any upward and downward movement of the arm 56 by operation of the servo motor 60 will cause upward and downward movement of the arm 71 which in turn causes the L-shaped member 74 to pivotally rotate about pivot point 80 to move the course bar 78 to the right or to the left as viewed in FIGURE 2.

To accommodate control of the means indicating the desired heading of the aircraft according to signals received from a range transmitter as will be explained, the plate-like member 77 is fixedly attached to the rod 83 for rotatable movement therewith. The other end of the rod 83 extends below and beyond the hollow rods 50 and 51 and is connected to a flexible cable 84 through a suitable gearing means or the like, such as bevel gears 85. The other end of the flexible cable is suitably attached in any convenient manner to another rod 86 which in turn is connected to a servo motor or like device 87 by means of a gearing means or like devices 88. For convenience in selecting the desired heading to correspond to the direction of a range or radio guiding means, a suitable knob 90 is connected to the shaft 86 and disposed in such a manner so as to disengage the gearing means 88 to permit the knob to rotate the flexible shaft 84 which in turn will rotate the shaft 83, the plate 77, and the course bar 78 through the gearing means 85, as desired. In this manner, the servo motor or like device 87 which is suitably synchronized to an output servo motor or like device 91 of a gyroscopic compass (either the compass which operates servo motor 35 or a separate one) will control the movement of the plate-like member 77 according to the signals received in the gyroscopic compass in the conventional manner. A suitable pointer such as 92 (see FIGURE 2) is connected to the plate-like member 77 to indicate the desired heading and as shown in FIGURE 2 can be conveniently arranged to correspond with the pointer member 67 and the nose 47 of the replica 20 when the heading of the aircraft and the desired heading correspond. Thus, as can clearly be seen from the description of our instrument in FIGURES 2 and 3 the movement of the replica 20 by operation of the servo motors 32, 33 and 34, with respect to the compass ring 26 will present to the pilot an exact three dimensional duplication of the attitude of the aircraft with respect to the earth at all times. For example, upward or downward movement of the nose 47 will show the pitch of the aircraft and any upward or downward movement of the wing tips 45 and 46 with respect to the compass ring will duplicate any bank or roll. The heading of the aircraft will clearly be shown on the compass ring. A pilot will be able to utilize this information and grasp its significance since it is presented to him in a manner in which he is accustomed to receiving it during visual flying conditions.

It can also be seen from the above description that enroute and landing navigational information can be superimposed on the replica 20 and thus easily interpreted by the relationship of this latter information and that presented by the replica 20. As explained above, the operation of servo motor 60 according to the signal received from a receiver 15 will be clearly discernible by the position of the course bar 78 with respect to the heading indicator 92. As is well-known, the direction to a range signal transmitter can be selected as a course, or preselected navigational path of travel, and any deviation from that selected course will be immediately recognized by the movement of the course bar 78 to the right or to the left of center. For example, if the desired heading indicator 92 is directed toward a known range transmitter as the selected heading (which selection is easily accomplished in our instrument by manipulation of the knob 90 above explained to rotate plate 77 and course bar 78 to any desired heading) the gyroscopic compass and its associated servo motors will maintain the course bar 78 on this heading. Any deviation or drift due to winds or otherwise will be discernible by the angular or lateral change, respectively, in position of the course bar.

Similarly, upon landing approaches signals received in the glide slope receiver 16 which is connected to the servo motor 55 will cause a deviation of the glide slope pointer 67 with respect to the nose 47 of the replica 20. Any displacement of the aircraft upwardly or downwardly from the correct glide path will be immediately discernible by the relative position of the pointer 47 and the pointer 67. Also any displacement of the aircraft to the right or to the left of the localizer beam will be immediately discernible by the position to the right or to the left of the course bar 78. Proper interpretation of this information and correction of the pilot's errors in the attitude or location of the aircraft will be obvious. Also, the precise position of the aircraft itself with respect to the horizon can be immediately perceived by the position of the replica 20 with respect to the compass ring. Further explanation of the operation of these enroute and landing navigational instruments herein is deemed unnecessary since their operation is conventional and well-known. It is important to note that this information is presented to the pilot in relationship to the aircraft with respect to a localizer or range transmitter beam or glide slope path. Further uses of such instrumentation as in holding procedures, localizer interpretation, etc. are apparent and it is to be equally obvious that our invention has eliminated many instruments presently necessary.

It is to be noted, also, that our device is a rather simple, compact instrument and, as shown, is surrounded by the enclosure 24 so that it may be conveniently located for viewing by the pilot. Enclosure 24 encloses our instrument by a diagonally located plate 93 conveniently fitted over and attached to the base member 24 and the enclosure is provided with suitable false bases or cavities 94 to conceal any of the wiring and the servo motors as desirable. While we have shown the enclosure as suitable for mounting on an instrument panel, obviously, our invention is equally well suited for mounting on a pedestal or any other convenient place.

From the foregoing description of our invention, it can be seen that our invention comprises in its broadest aspects a three dimensional simulation of the activity of an aircraft with respect to the earth coupled with a convenient manner of presenting enroute and landing information to the pilot.

While the various parts herein have been described as upper or lower or in a left or right position, such description refers only to the relative position of the parts as shown in the drawings and is not intended to be a limitation of the invention.

We claim:

1. In an aircraft having gyroscopic attitude and azimuth sensing means; a flight instrument having means connected to said gyroscopic means for indicating the pitch, bank, and yaw of the aircraft; means defining a replica of said aircraft within said instrument and fixed on said aircraft for indicating the attitude and direction of the aircraft by relative movement between said replica and said first mentioned means, said replica having a longitudinal dimension as a facsimile of a fuselage and disposed substantially parallel to the main axis of the aircraft fuselage and a lateral dimension as a facsimile of a wing and disposed substantially parallel to the main axis of the aircraft wing; said replica being mounted in permanent alignment and relationship with said aircraft, said second mentioned means comprising compass ring means horizontally disposed and controlled to maintain parallel relationship with the horizon and orientation in azimuth and surrounding the replica but movable relative thereto so that the longitudinal and lateral dimensions of the replica each by their relationship with the surrounding compass ring means when viewed perspectively will assume a three-dimensional effect indicating the exact heading and the attitude that the aircraft has with the horizon; and means superimposed on said attitude indicating means and said replica and responsive to a signal received in said aircraft for indicating displacement of the aircraft from a pre-determined navigational path.

2. In an aircraft having gyroscopic attitude and azimuth sensing means; a flight instrument having means connected to said gyroscopic means for indicating the pitch, bank and yaw of the aircraft; means defining a replica of said aircraft within said instrument and fixed on said aircraft for indicating the attitude and direction of the aircraft by relative movement between said replica and said first mentioned means, said replica having a longitudinal dimension as a facsimile of a fuselage and disposed substantially parallel to the main axis of the aircraft fuselage and a lateral dimension as a facsimile of a wing and disposed substantially parallel to the main axis of the aircraft wing; said replica being mounted in permanent alignment and relationship with said aircraft, said second mentioned means comprising compass ring means horizontally disposed and controlled to maintain parallel relationship with the horizon and orientation in azimuth and surrounding the replica but movable relative thereto so that the longitudinal and lateral dimensions of the replica each by their relationship with the surrounding compass ring means when viewed perspectively will assume a three-dimensional effect indicating the exact heading and the attitude that the aircraft has with the horizon; means superimposed on said attitude indicating means and said replica and responsive to a signal received in said aircraft for indicating displacement of the aircraft from a pre-determined course path; and means cooperating with said replica and responsive to a signal received in said aircraft for indicating displacement of the aircraft from a pre-determined glide path.

3. In an aircraft having gyroscopic attitude and azimuth sensing means; a flight instrument having means connected to said gyroscopic means for indicating the pitch, bank, and yaw of the aircraft; means defining a replica of said aircraft within said instrument and fixed on said aircraft for indicating the attitude and direction of the aircraft by relative movement between said replica and said first mentioned means, said replica having a longitudinal dimension as a facsimile of a fuselage and disposed substantially parallel to the main axis of the aircraft fuselage and a lateral dimension as a facsimile of a wing and disposed substantially parallel to the main axis of the aircraft wing; said replica being mounted in permanent alignment and relationship with said aircraft, said second mentioned means comprising compass ring means horizontally disposed and controlled to maintain parallel relationship with the horizon and orientation in azimuth and surrounding the replica but movable relative thereto so that the longitudinal and lateral dimensions of the replica each by their relationship with the surrounding compass ring means when viewed perspectively will assume a three-dimensional effect indicating the exact heading and the attitude that the aircraft has with the horizon; and means comprising a course bar superimposed on said attitude indicating means and said replica and responsive to a signal received in said aircraft for indicating displacement of the aircraft from a pre-determined course path.

4. In an aircraft having gyroscopic attitude and azimuth sensing means; a flight instrument having means connected to said gyroscopic means for indicating the pitch, bank, and yaw of the aircraft; means defining a replica of said aircraft within said instrument and fixed on said aircraft for indicating the attitude and direction of the aircraft by relative movement between said replica and said first mentioned means, said replica having a longitudinal dimension as a facsimile of a fuselage and disposed substantially parallel to the main axis of the aircraft fuselage and a lateral dimension as a facsimile of a wing and disposed substantially parallel to the main axis of the aircraft wing; said replica being mounted in permanent alignment and relationship with said aircraft, said second mentioned means comprising compass ring means horizontally disposed and controlled to maintain parallel relationship with the horizon and orientation in azimuth and surrounding the replica but movable relative thereto so that the longitudinal and lateral dimensions of the replica each by their relationship with the surrounding compass ring means when viewed perspectively will assume a three-dimensional effect indicating the exact heading and the attitude that the aircraft has with the horizon; means superimposed on said attitude indicating means and said replica and responsive to a signal received in said aircraft for indicating displacement of the aircraft from a pre-determined course path; and means comprising pointer means cooperating with said replica and responsive to a signal received in said aircraft for indicating displacement of the aircraft from a pre-determined glide path.

5. In an aircraft having gyroscopic attitude and azimuth sensing means; a flight instrument having means connected to said gyroscopic means for indicating the pitch, bank, and yaw of the aircraft; means defining a replica of said aircraft within said instrument and fixed on said aircraft for indicating the attitude and direction of the aircraft by relative movement between said replica and said first mentioned means, said replica having a longitudinal dimension as a facsimile of a fuselage and disposed substantially parallel to the main axis of the aircraft fuselage and a lateral dimension as a facsimile of a wing and disposed substantially parallel to the main axis of the aircraft wing; said replica being mounted in permanent alignment and relationship with said aircraft, said second mentioned means comprising compass ring means horizontally disposed and controlled to maintain parallel relationship with the horizon and orientation in azimuth and surrounding the replica but movable relative thereto so that the longitudinal and lateral dimensions of the replica by their relationship with the surrounding compass ring means when viewed perspectively will assume a three-dimensional effect indicating the exact heading and the attitude that the aircraft has with the horizon; and means comprising a course bar superimposed on said attitude indicating means and said replica and responsive to a signal received in said aircraft whereby displacement of said course bar from center indicates displacement of the aircraft from a pre-determined course path.

6. In an aircraft having gyroscopic attitude and azimuth sensing means; a flight instrument having means connected to said gyroscopic means for indicating the pitch, bank, and yaw of the aircraft; means defining a replica of said aircraft within said instrument and fixed on said aircraft for indicating the attitude and direction of the aircraft by relative movement between said replica and said first mentioned means, said replica having a longitudinal dimension as a facsimile of a fuselage and disposed substantially parallel to the main axis of the aircraft fuselage and a lateral dimension as a facsimile of a wing and disposed substantially parallel to the main axis of the aircraft wing; said replica having a nose aligned with the longitudinal dimension of the replica, and said replica being mounted in permanent alignment and relationship with said aircraft, said second mentioned means comprising compass ring means horizontally disposed and controlled to maintain parallel relationship with the horizon and orientation in azimuth and surrounding the replica but movable relative thereto so that the longitudinal and lateral dimensions of the replica by their relationship with the surrounding compass ring means when viewed perspectively will assume a three-dimensional effect indicating the exact heading and the attitude that the aircraft has with the horizon; means defining a course bar superimposed on said attitude indicating means and said replica and responsive to a signal received in said aircraft whereby displacement of said course bar from center indicates any displacement of the aircraft from a pre-determined course path; and means comprising pointer means cooperating with the nose of said replica and responsive to a signal received in said aircraft whereby displacement of said pointer means from the nose of said replica indicates displacement of the aircraft from a pre-determined glide path.

7. In an aircraft having gyroscopic attitude and azimuth sensing means; a flight instrument having means connected to said gyroscopic means for indicating the pitch, bank, and yaw of the aircraft; means defining a replica of said aircraft within said instrument and fixed on said aircraft for indicating the attitude and direction of the aircraft by relative movement between said replica and said first mentioned means, said replica having a longitudinal dimension as a facsimile of a fuselage and disposed substantially parallel to the main axis of the aircraft fuselage and a lateral dimension as a facsimile of a wing and disposed substantially parallel to the main axis of the aircraft wing; said replica having a nose aligned with the longitudinal dimension of the replica, and said replica being mounted in permanent alignment and relationship with said aircraft, said second mentioned means comprising compass ring means horizontally disposed and controlled to maintain parallel relationship with the horizon and orientation in azimuth and surrounding the replica but movable relative thereto so that the longitudinal and lateral dimensions of the replica by their relationship with the surrounding compass ring means when viewed perspectively will asume a three-dimensional effect indicating the exact heading and the attitude that the aircraft has with the horizon; means comprising a course bar superimposed on said attitude indicating means and said replica and responsive to a signal received in said aircraft whereby displacement of said course bar from center indicates any displacement of the aircraft from a pre-determined course path; and means comprising pointer means cooperating with the nose of said replica and responsive to a signal received in said aircraft whereby displacement of said pointer means indicates displacement of the aircraft from a pre-determined glide path.

8. In an aircraft having gyroscopic attitude and azimuth sensing means; a flight instrument having means connected to said gyroscopic means for indicating the pitch, bank, and yaw of the aircraft; means defining a replica of said aircraft within said instrument and fixed on said aircraft for indicating the attitude and direction of the aircraft by relative movement between said replica and said first-mentioned means, said replica having a longitudinal dimension as a facsimile of a fuselage and disposed substantially parallel to the main axis of the aircraft fuselage and a lateral dimension as a facsimile of a wing and disposed substantially parallel to the main axis of the aircraft wing; said replica having a nose aligned with the longitudinal dimension of the replica, and said replica being mounted in permanent alignment and relationship with said aircraft, said second mentioned means comprising compass ring means horizontally disposed and controlled to maintain parallel relationship with the horizon and orientation in azimuth and surrounding the replica but movable relative thereto so that the longitudinal and lateral dimensions of the replica by their relationship with the surrounding compass ring means when viewed perspectively will assume a three-dimensional effect indicating the exact heading and the attitude that the aircraft has with the horizon; and means cooperating with the nose of said replica and responsive to a signal received in said aircraft for indicating displacement of the aircraft from a pre-determined glide path.

9. In an aircraft having gyroscopic attitude and azimuth sensing means; a flight instrument having means connected to said gyroscopic means for indicating the pitch, bank, and yaw of the aircraft; means defining a replica of said aircraft within said instrument and fixed on said aircraft for indicating the attitude and direction of the aircraft by relative movement between said replica and said first mentioned means, said replica having a longitudinal dimension as a facsimile of a fuselage and disposed substantially parallel to the main axis of the aircraft fuselage and a lateral dimension as a facsimile of a wing and disposed substantially parallel to the main axis of the aircraft wing; said replica having a nose aligned with the longitudinal dimension of the replica, and said replica being mounted in permanent alignment and relationship with said aircraft, said second mentioned means comprising compass ring means horizontally disposed and controlled to maintain parallel relationship with the horizon and orientation in azimuth and surrounding the replica but movable relative thereto so that the longitudinal and lateral dimensions of the replica by their relationship with the surrounding compass ring means when viewed perspectively will assume a three-dimensional effect indicating the exact heading and the attitude that the aircraft has with the horizon; means superimposed on said attitude indicating means and said replica and responsive to a signal received in said aircraft for indicating displacement of the aircraft from a pre-determined navigational path; and means for selecting the pre-determined navigational path.

10. In an aircraft having bank responsive, heading responsive, and pitch responsive mechanisms; an aircraft instrument visible to the pilot; means in said instrument connected to said bank, heading, and pitch responsive mechanisms for indicating to the pilot the bank, heading and pitch of the aircraft, said means including means defining a two-dimensional replica of said aircraft having a first dimension disposed parallel to the main axis of the aircraft fuselage and a second dimension disposed parallel to the main axis of the aircraft wing, the first said means including compass ring means horizontally disposed and controlled by said mechanisms to maintain a parallel relationship with the horizon and orientation in azimuth, the said compass ring means surrounding said replica but movable relative thereto so that said replica and its relationship to the surrounding ring means when viewed perspectively will assume a three-dimensional effect indicating the exact heading and the attitude that the aircraft has with the horizon; and means superimposed on said indicating means for indicating aircraft displacement from a pre-determined navigational path.

11. In an aircraft having bank responsive, heading responsive, and pitch responsive mechanisms; an aircraft instrument visible to the pilot; means in said instrument connected to said bank, heading, and pitch responsive mechanisms for indicating to the pilot the bank, heading and pitch of the aircraft, said means including means defining a two-dimensional replica of said aircraft having a first dimension disposed parallel to the main axis of the aircraft fuselage and a second dimension disposed parallel to the main axis of the aircraft wing, the first said means including compass ring means horizontally disposed and controlled by said mechanisms to maintain a parallel relationship with the horizon and orientation in azimuth, the said compass ring means surrounding said replica but movable relative thereto so that said replica and its relationship to the surrounding ring means when viewed perspectively will assume a three-dimensional effect indicating the exact heading and the attitude that the aircraft has with the horizon; and means superimposed on said indicating means for indicating any aircraft displacement from a pre-determined navigational path and from a pre-determined path of glide.

12. In an aircraft having bank responsive, heading responsive, and pitch responsive mechanisms; an aircraft instrument visible to the pilot; means defining an aircraft replica having a fuselage parallel to the aircraft fuselage and a wing parallel to the aircraft wing in said instrument, said instrument having means connected to said bank, heading, and pitch responsive mechanisms for indicating to the pilot the bank, heading and pitch of the aircraft, the second said means including compass ring means horizontally disposed and controlled by said mechanisms to maintain a parallel relationship with the horizon and orientation in azimuth, the said compass ring means surrounding said replica but movable relative thereto so that said replica and its relationship to the surrounding ring means when viewed perspectively will assume a three-dimensional effect indicating the exact heading and the attitude that the aircraft has with the horizon; and means superimposed on said replica for indicating the aircraft displacement from a pre-determined navigational path.

13. In an aircraft having bank responsive, heading responsive, and pitch responsive mechanisms; an aircraft instrument visible to the pilot; means defining an aircraft replica having a fuselage parallel to the aircraft fuselage and a wing parallel to the aircraft wing in said instrument, said instrument having means connected to said bank, heading, and pitch responsive mechanisms for indicating to the pilot the bank, heading and pitch of the aircraft, the second said means including compass ring means horizontally disposed and controlled by said mechanisms to maintain a parallel relationship with the horizon and orientation in azimuth, the said compass ring means surrounding said replica but movable relative thereto so that said replica and its relationship to the surrounding ring means when viewed perspectively will assume a three-dimensional effect indicating the exact heading and the attitude that the aircraft has with the horizon; and means superimposed on said replica for indicating aircraft displacement from a pre-determined course path and from a pre-determined path of glide.

14. In an aircraft having bank responsive, heading responsive, and pitch responsive mechanisms; an aircraft instrument visible to the pilot, means defining an aircraft replica having a fuselage parallel to the aircraft fuselage and a wing parallel to the aircraft wing in said instrument, said instrument having means connected to said bank, heading, and pitch responsive mechanisms for indicating to the pilot the bank, heading and pitch of the aircraft, the second said means including compass ring means horizontally disposed and controlled by said mechanisms to maintain a parallel relationship with the horizon and orientation in azimuth, the said compass ring means surrounding said replica but movable relative thereto so that said replica and its relationship to the surrounding ring means when viewed perspectively will assume a three-dimensional effect indicating the exact heading and the attitude that the aircraft has with the horizon; and means comprising a course bar superimposed on said replica for indicating aircraft displacement from a pre-determined course path.

15. In an aircraft having bank responsive, heading responsive, and pitch responsive mechanisms; an aircraft instrument visible to the pilot, means defining an aircraft replica having a fuselage parallel to the aircraft fuselage and a wing parallel to the aircraft wing in said instrument, said instrument having means connected to said bank, heading, and pitch responsive mechanisms for indicating to the pilot the bank, heading and pitch of the aircraft, the second said means including compass ring means horizontally disposed and controlled by said mechanisms to maintain a parallel relationship with the horizon and orientation in azimuth, the said compass ring means surrounding said replica but movable relative thereto so that said replica and its relationship to the surrounding ring means when viewed perspectively will assume a three-dimensional effect indicating the exact heading and the aircraft has with the horizon; means comprising a course bar superimposed on said replica for indicating aircraft displacement from a pre-determined course path; and means comprising pointer means movable with respect to the nose of said replica for indicating displacement of the aircraft from a pre-determined path of glide, and from a pre-determined heading.

16. In combination with an aircraft having gyroscopic attitude and azimuth sensing means, an aircraft attitude indicator comprising an aircraft replica having nose means and wing means mounted in permanent alignment and relationship with said aircraft to simulate said aircraft, compass ring means horizontally disposed and surrounding said replica, said replica and said compass ring being mounted in movable relationship with each other and the compass ring being gyroscopically controlled by said first mentioned means to maintain a parallel relationship with the horizon and stabilized in azimuth, said nose means and using means being closely adjacent the ring means so that their position above or below the ring means indicates the pitch and bank of the aircraft with respect to the horizon clearly and directly and whereby the position of the nose circumferentially of the compass ring represents the aircraft orientation in azimuth.

17. The combination claimed in claim 16 wherein said compass ring means comprises an enclosure means surrounding said replica.

18. In an aircraft having gyroscopic attitude and azimuth sensing means, an aircraft attitude indicator comprising means defining a replica of an aircraft having nose means and wing means, means defining a compass ring disposed about said replica, said replica being disposed in close proximity to said compass ring in substantially coplanar relationship therewith but in permanent alignment and relationship to said aircraft to move therewith, said compass ring being movably mounted and gyroscopically controlled by said first mentioned means to maintain a parallel relationship with the horizon and stabilized in azimuth, both said replica and said compass ring being arranged in said aircraft to be viewed perspectively so that the nose and wings and their relationship to said compass ring simulates the aircraft attitude with the horizon in the same manner and in the same way that the pilot visualizes the aircraft itself with the horizon.

References Cited in the file of this patent

UNITED STATES PATENTS

| | | |
|---|---|---|
| 1,726,643 | Borresen | Sept. 3, 1929 |
| 1,975,442 | Allen | Oct. 2, 1934 |
| 2,323,897 | Carter | July 13, 1943 |
| 2,467,412 | Walthen | Apr. 19, 1949 |
| 2,567,212 | Klopp et al. | Sept. 11, 1951 |
| 2,685,226 | Crane | Aug. 3, 1954 |
| 2,700,898 | Fragola et al. | Feb. 1, 1955 |
| 2,747,293 | Lyons | May 29, 1956 |
| 2,782,395 | Hammond | Feb. 19, 1957 |
| 2,796,594 | Chombard | June 18, 1957 |

FOREIGN PATENTS

| | | |
|---|---|---|
| 349,026 | Great Britain | May 19, 1931 |